United States Patent [19]

Gulick

[11] Patent Number: 5,337,103
[45] Date of Patent: Aug. 9, 1994

[54] CASE FOR OVERHEAD PROJECTION DISPLAY PANEL

[75] Inventor: Paul E. Gulick, Tualatin, Oreg.

[73] Assignee: In Focus Systems, Inc., Tualatin, Oreg.

[21] Appl. No.: 1,055

[22] Filed: Jan. 6, 1993

[51] Int. Cl.5 .............................................. G03B 21/14
[52] U.S. Cl. ..................................... 353/119; 353/122
[58] Field of Search ........... 353/122, 119, 97, DIG. 3, 353/88; 359/83

[56] References Cited

U.S. PATENT DOCUMENTS

| 4,917,465 | 4/1990 | Conner et al. | |
| 4,946,274 | 8/1990 | Honda | 353/122 |
| 4,950,072 | 8/1990 | Honda | 353/122 |
| 5,121,984 | 6/1992 | Jones et al. | 353/122 |
| 5,173,686 | 12/1992 | Fujihara | 340/700 |
| 5,227,820 | 7/1993 | Miyoshita et al. | 353/122 |
| 5,231,434 | 7/1993 | Kennedy et al. | |

Primary Examiner—William A. Cuchlinski, Jr.
Assistant Examiner—William C. Dowling
Attorney, Agent, or Firm—Stoel Rives Boley Jones & Grey

[57] ABSTRACT

The present invention includes a case (54) for an overhead projection display panel (50) used with an overhead projector light source (52). The case supports a light modulating element (60) such as, for example, a liquid crystal device, and encases modulation control circuitry (32) for controlling the light modulating element. The case includes an annular case element (56) for supporting the light modulating element along its side margin so that it can modulate light transmitted from the overhead projector light source. The case also includes an occluding panel (58) connected to and extendable from the annular case element for selectably occluding a portion of the overhead projector light source. At least one of the annular case elements and the occluding panel encasing the modulation control circuitry of the display panel.

38 Claims, 7 Drawing Sheets

CASE FOR OVERHEAD PROJECTION DISPLAY PANEL

TECHNICAL FIELD

The present invention relates to overhead projection display panels operable with overhead projector light sources to display computer-generated and video information on a projection screen and, in particular, to an improved case for such display panels.

BACKGROUND OF THE INVENTION

Figure 1A:
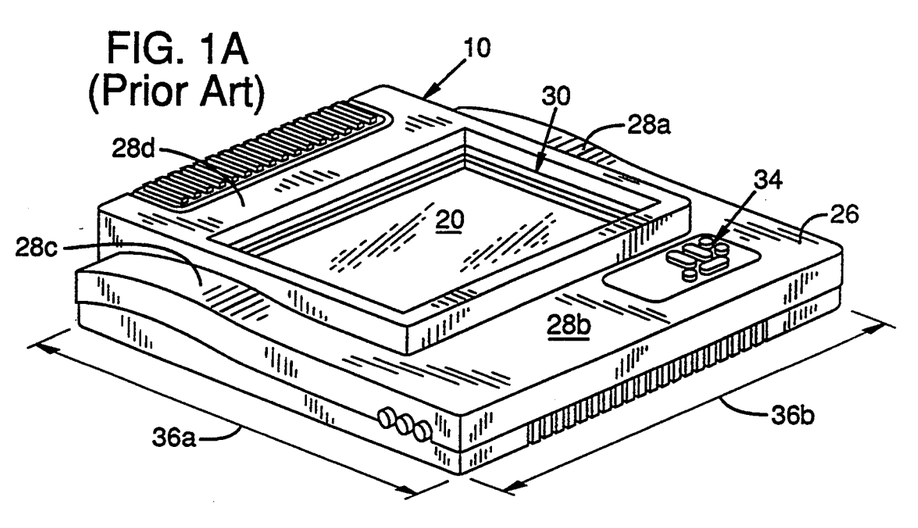
FIGS. 1A and 1B are respective perspective and diagrammatic side views of a prior art overhead projection display panel and a conventional overhead projector light source.
Figure 1B:
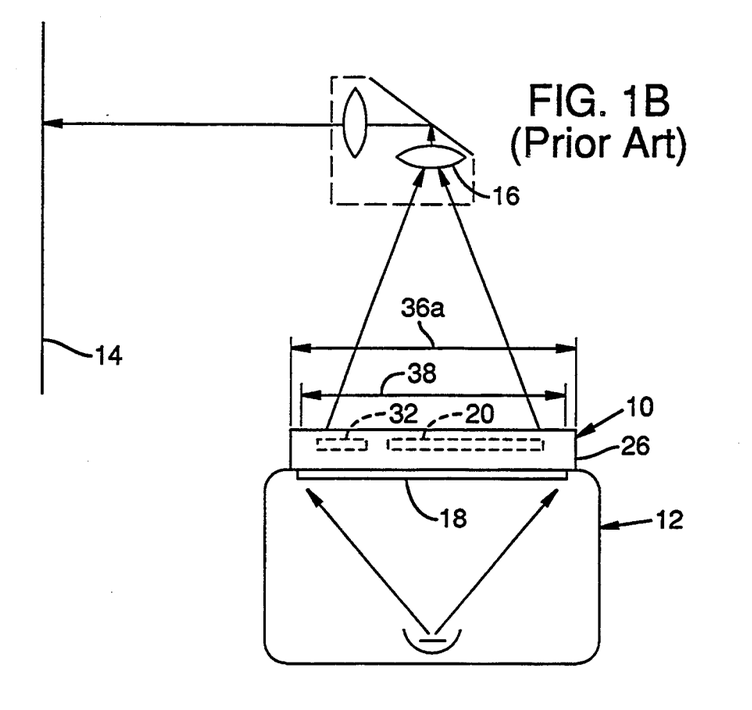

FIGS. 1A and 1B show respective perspective and diagrammatic side views of a prior art overhead projection display panel 10 that operates with a conventional overhead projector light source 12 to display computer-generated information on a projection screen 14. Overhead projector 12 includes a projection lens assembly 16 that projects onto projection screen 14 light received from a light surface 18. The light transmitted from light surface 18 passes through an information-bearing medium, such as a sheet of transparent film or display panel 10, and carries the information to projection screen 14.

Display panel 10 selectively activates pixels within a transmissive liquid crystal device 20 to attenuate light received from light surface 18 of overhead projector 12 according to display data received from a personal computer (not shown) or other video source. As a result, display panel 10 modifies the light generated by overhead projector 12 to form the computer-generated image on projection screen 14. Such a display panel is described in U.S. Pat. No. 4,917,465 of Conner et al., issued Apr. 17, 1990 and assigned to the assignee of the present application.

Display panel 10 includes a substantially rigid annular case 26 with side margins 28a–28d that support liquid crystal device 20 within an aperture 30. Case 26 encases electronics 32 (shown in outline), which control liquid crystal device 20, within at least one of side margins 28a–28d and supports a control panel 34 that controls various display characteristics of the display panel such as, for example, color, contrast, cursor position, or switching to different display images. Case 26 is of a relatively large size with a length 36a and a width 36b that are greater than the corresponding 10 inch (25 cm) length 38 and width (not shown) of light surface 18. The relatively large size of case 26 allows it to perform three functions: support liquid crystal device 20 over light surface 18, encase the electronics that control liquid crystal device 20, and occlude light emitted from portions of light surface 18 not aligned with liquid crystal device 20. The occluding function allows display panel 10 to form the computer-generated display images without distracting extraneous boundaries of unused light.

A consequence of the relatively large size of case 26 is that display panel 10 is relatively bulky and cumbersome to handle or store (i.e., lacks portability), particularly when compared to modern laptop personal computers. Moreover, to prevent the size of case 26 from being even greater, the electronics for controlling or powering liquid crystal device 20 often do not include all possible features.

SUMMARY OF THE INVENTION

An object of the present invention is, therefore, to provide an overhead projection display panel that is more portable than prior art display panels.

Another object of this invention is to provide for such a display panel a case that is compact and convenient to handle.

A further object of this invention is to provide such a case that blocks extraneous light emitted by an overhead projector light surface.

Still another object of this invention is to provide such a case that can accommodate additional electronics to support increased functionality for the display panel.

The present invention includes an overhead projection display panel and, in particular, a case for such display panels. The case supports a light modulating element such as, for example, a liquid crystal device, and encases modulation control circuitry for controlling the light modulating element. The case includes an annular case element for supporting the light modulating element along its side margins so that it can modulate light transmitted from an overhead projector light surface.

The case also includes an occluding panel connected to and extendable from the annular case element for occluding a portion of the overhead projector light surface. At least one of the annular case element and the occluding panel encase modulation control circuitry of the display panel. When it is used to encase control or power circuitry, the occluding panel is capable of accommodating relatively large components, such as batteries or disk drives, that cannot be accommodated by conventional display panels. It will be appreciated, therefore, that the extendability of the occluding panel provides the display panel with significantly improved storage, portability, and potential functionality while still maintaining sufficient size when being used to block excess light from the overhead projector light surface.

In a first preferred embodiment, the occluding panel is configured as a drawer that encases the modulation control circuitry and is longitudinally extendable from the annular case element. In a second preferred embodiment, a pair of occluding panels are pivotally coupled to the annular case element by hinges to swing away from the annular case element to block extraneous light.

Additional objects and advantages of the present invention will be apparent from the detailed description of the preferred embodiments thereof, which proceeds with reference to the accompanying drawings.

DETAILED DESCRIPTION OF PREFERRED EMBODIMENTS

Figure 2:
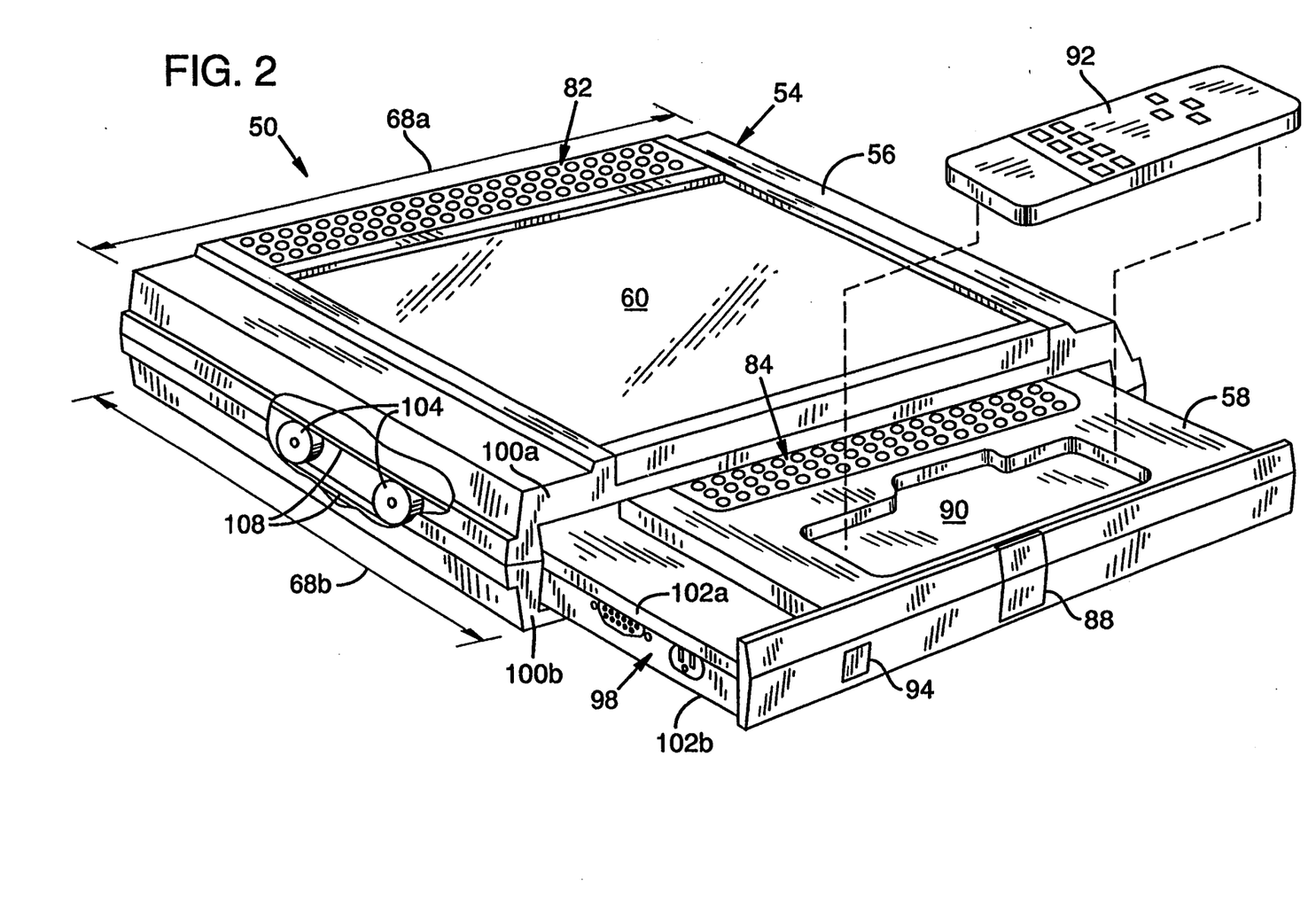
FIG. 2 is a perspective view of an overhead projection display panel employing a case of the present invention with an extended occluding panel configured as a drawer.
Figure 3:
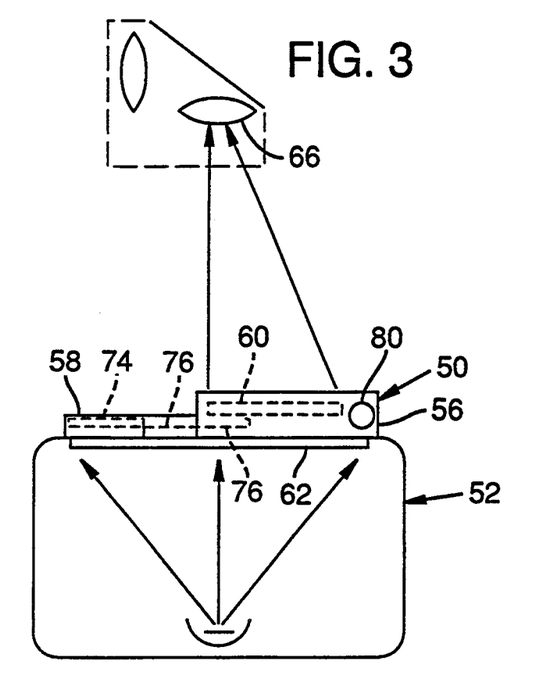
FIG. 3 is a diagrammatic side view of the overhead projection display panel of FIG. 2 positioned with an overhead projector light source.
Figure 4:
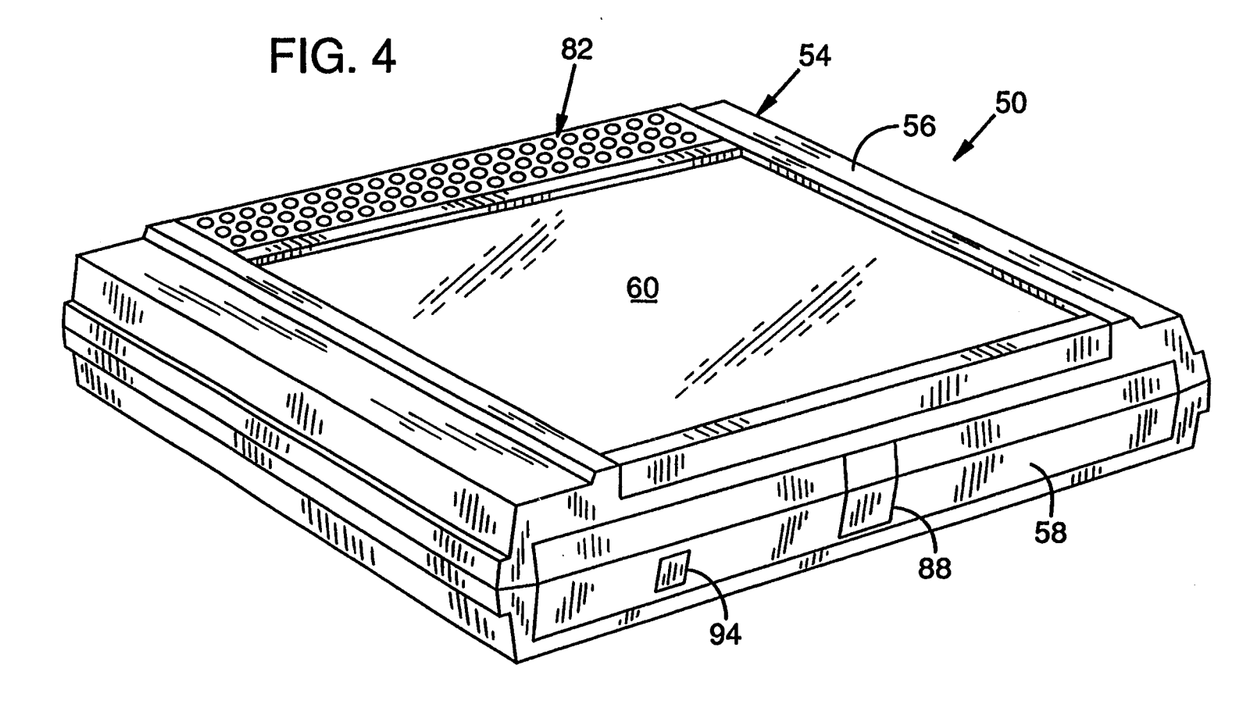
FIG. 4 is a perspective diagram of the display panel of FIG. 2 with the occluding panel retracted.

FIGS. 2 and 3 show respective perspective and diagrammatic side views of an overhead projection display panel 50 that operates with a conventional overhead projector light source 52 to display computer-generated information on a projection screen (not shown) in the manner described above with reference to overhead projection display panel 10. Display panel 50 includes a case 54 of the present invention having an annular case element 56 and an occluding panel 58 longitudinally extendable from annular case element 56. Occluding panel 58 is shown in its extended position in FIGS. 2 and 3 and in a retracted or storage position in FIG. 4.

Annular case element 56 supports a light modulating element 60 such as, for example, a liquid crystal device of the type described in U.S. Pat. No. 4,917,465 of Conner et al. Light modulating element 60 is supported by its side margins so that light emitted from a light surface 62 of overhead projector 52 passes through light modulating element 60 toward the projection screen via a projection lens assembly 66.

Figure 5:
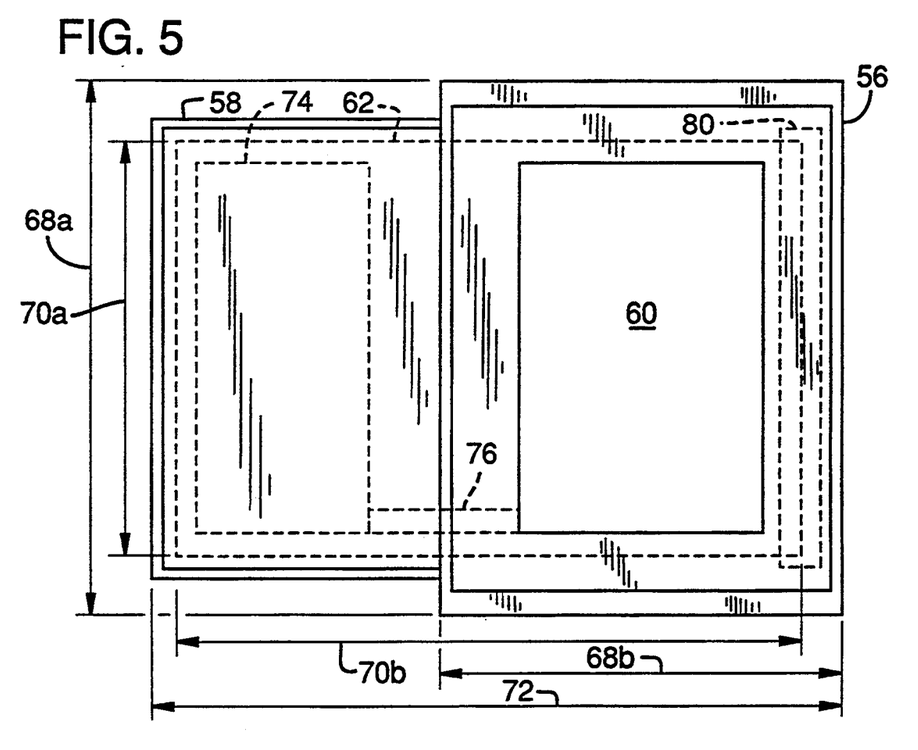
FIG. 5 is an outline of the overhead projection display panel of FIG. 2 showing locations of its operating elements.

With additional reference to FIG. 5, annular case element 56 has a width 68a and a length 68b that are, respectively, greater and less than the corresponding width 70a and length 70b of light surface 62. When occluding panel 58 is in its retracted or storage position, case 54 is relatively small, convenient to handle and store and, therefore, very portable. Occluding panel 58 in its extended position provides case element 52 with a length 72 that is greater than length 70b of light surface 62, thereby blocking undesirable light that would otherwise propagate past annular case element 56 to the projection screen. The extendibility of occluding panel 58 provides, therefore, case 54 with significantly improved storage and portability with sufficient size when being used to block excess portions of light surface 62.

Preferably, occluding panel 58 encases modulation control circuitry 74 that controls operation of light modulating element 60. Modulation control circuitry 74 communicates with light modulating element 60 via a flexible circuit coupling 76 that is looped between modulation control circuitry 74 and light modulating element 60. An elongated "squirrel-cage" fan 80 is positioned along an end margin of annular case element 56 opposite occluding panel 58. Fan 80 draws ambient air through an intake grill 82 and passes the air along light modulating element 60, toward modulation control circuitry 74, and out an exhaust grill 84. The cooling air passes along and cools light modulating element 60 and modulation control circuitry 74.

Occluding panel 58 includes a latch 88 for securing occluding panel 58 in its retracted position and a cradle 90 for supporting in storage a remote control unit 92 that controls various display characteristics of display panel 50. For example, remote control unit 92 can direct infrared light signals to a photoreceptor input 94 for controlling various display characteristics such as, for example, switching display panel 50 on and off, changing between different display images, moving a cursor, or changing image brightness, as described in U.S. Pat. No. 5,101,197 of Hix et al. for Electronic Transparency Method and Apparatus. Occluding panel 58 also supports sockets 98 (two shown) for delivering power and display data to display panel 50.

Annular case element 56 and occluding panel 58 may be constructed or formed in any conventional manner such as, for example, with respective mated pairs 100a, 100b and 102a, 102b of injection-molded plastic components joined by screws or snap clips (not shown). Occluding panel 58 preferably supports a pair of spaced-apart rollers 104 on its anterior side panels for engaging an elongated closed track 108 on each interior side panel of annular case element 56. It will be appreciated, however, that the construction of and manner of engaging annular case element 56 and occluding panel 58 may vary significantly from the preferred embodiment while still providing the benefits of the present invention.

Figure 6:
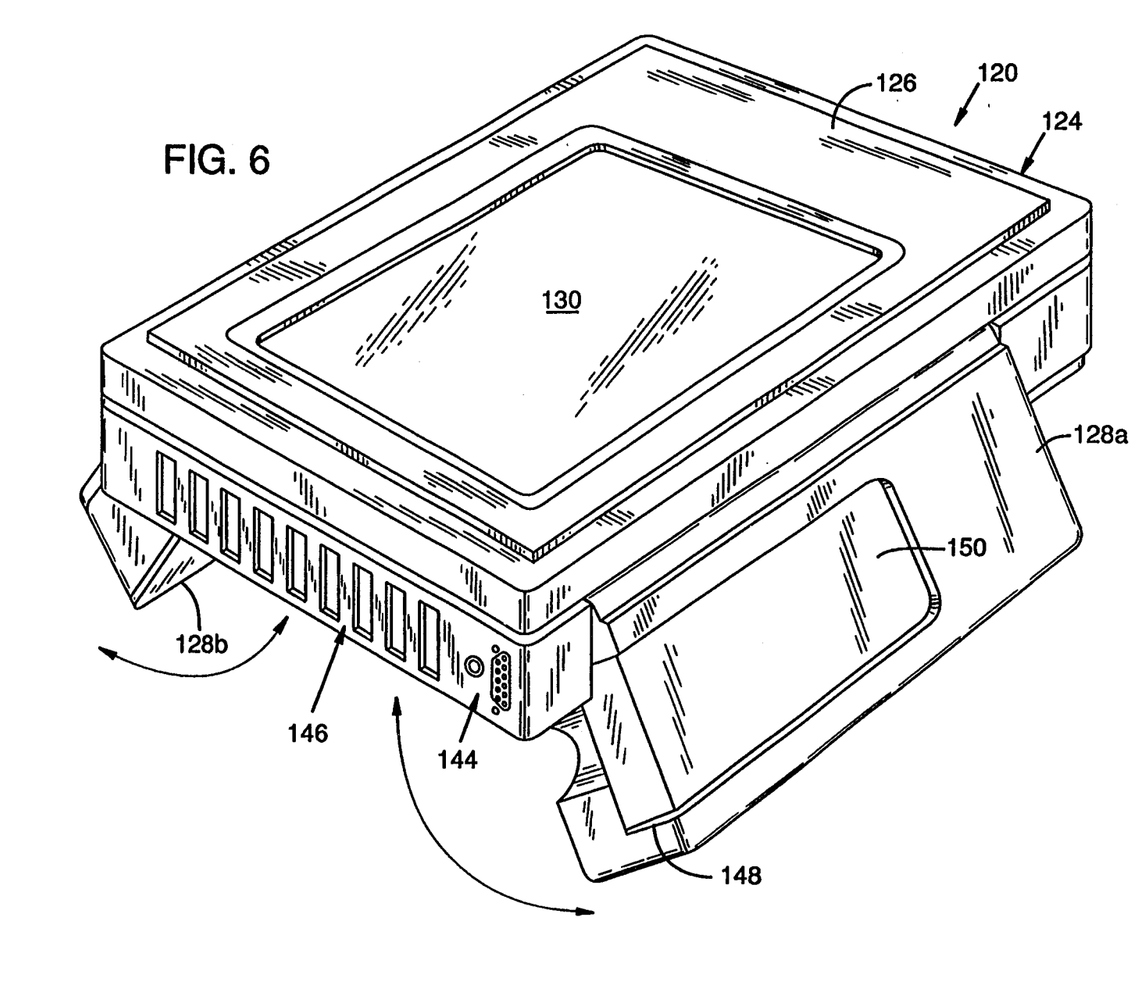
FIG. 6 is a perspective view of an overhead projection display panel employing a case of the present invention with a pair of partly extended occluding panels pivotally coupled to an annular case element.
Figure 7:
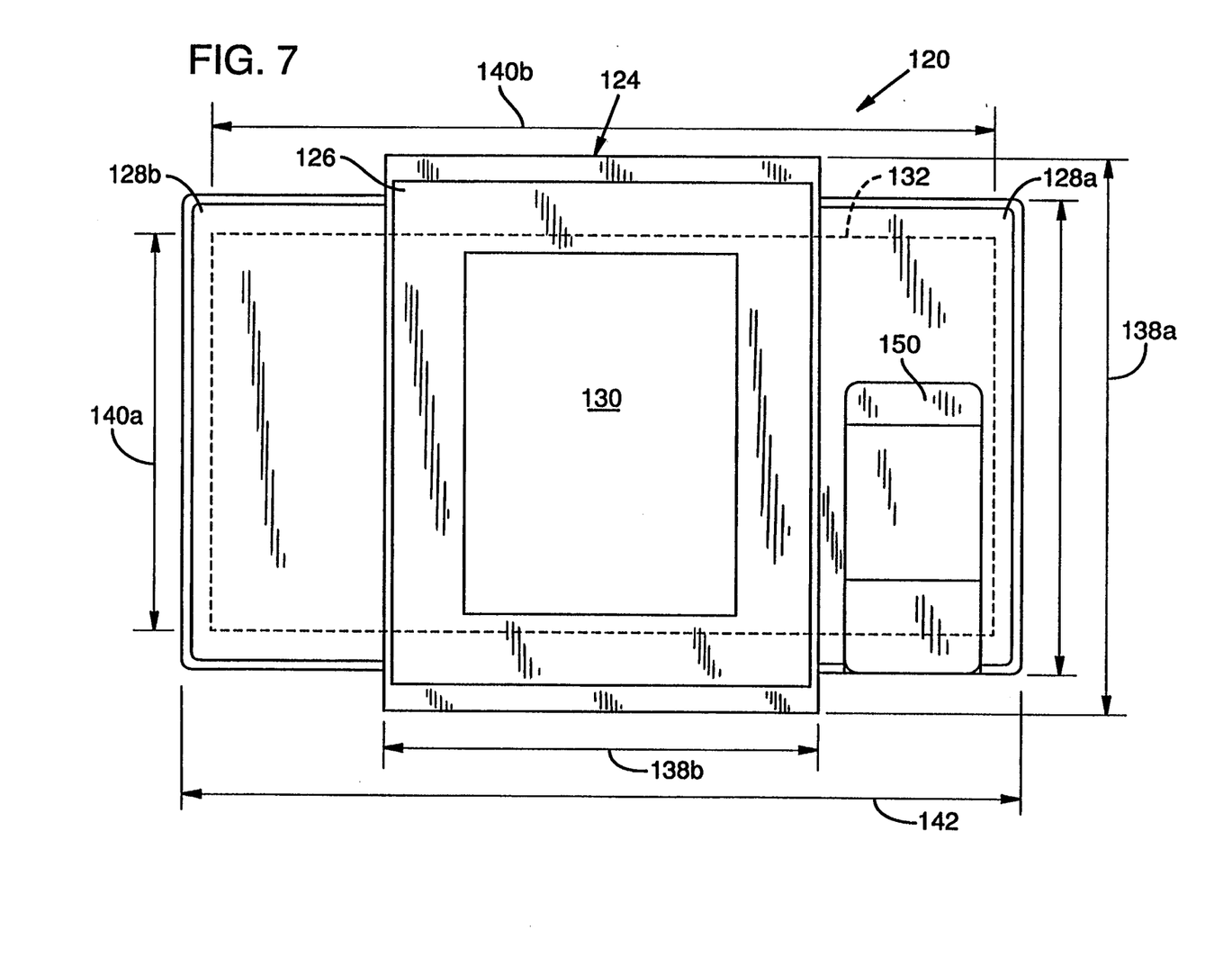
FIG. 7 is a plan view of the overhead projection display panel of FIG. 6 positioned with an overhead projector light source.

FIGS. 6 and 7 show respective perspective and top plan views of an overhead projection display panel 120 that operates with a conventional overhead projector light source (not shown) to display computer-generated information on a projection screen (not shown) in the manner described above with reference to overhead projection display panel 10. Display panel 120 includes a case 124 of the present invention having an annular case element 126 and a pair of occluding panels 128a and 128b pivotably connected to and extendable from annular case element 126. Occluding panels 128a and 128b are shown partly extended in FIG. 6, fully extended in FIG. 7 and retracted in FIG. 8.

Annular case element 126 supports a light modulating element 130 such as, for example, a liquid crystal device of the type described in U.S. Pat. No. 4,917,465 of Conner et al. Light modulating element 130 is supported by its side margins so that light emitted from a light surface 132 (FIG. 7) of an overhead projector passes through light modulating element 130 toward the projection screen.

Figure 8:
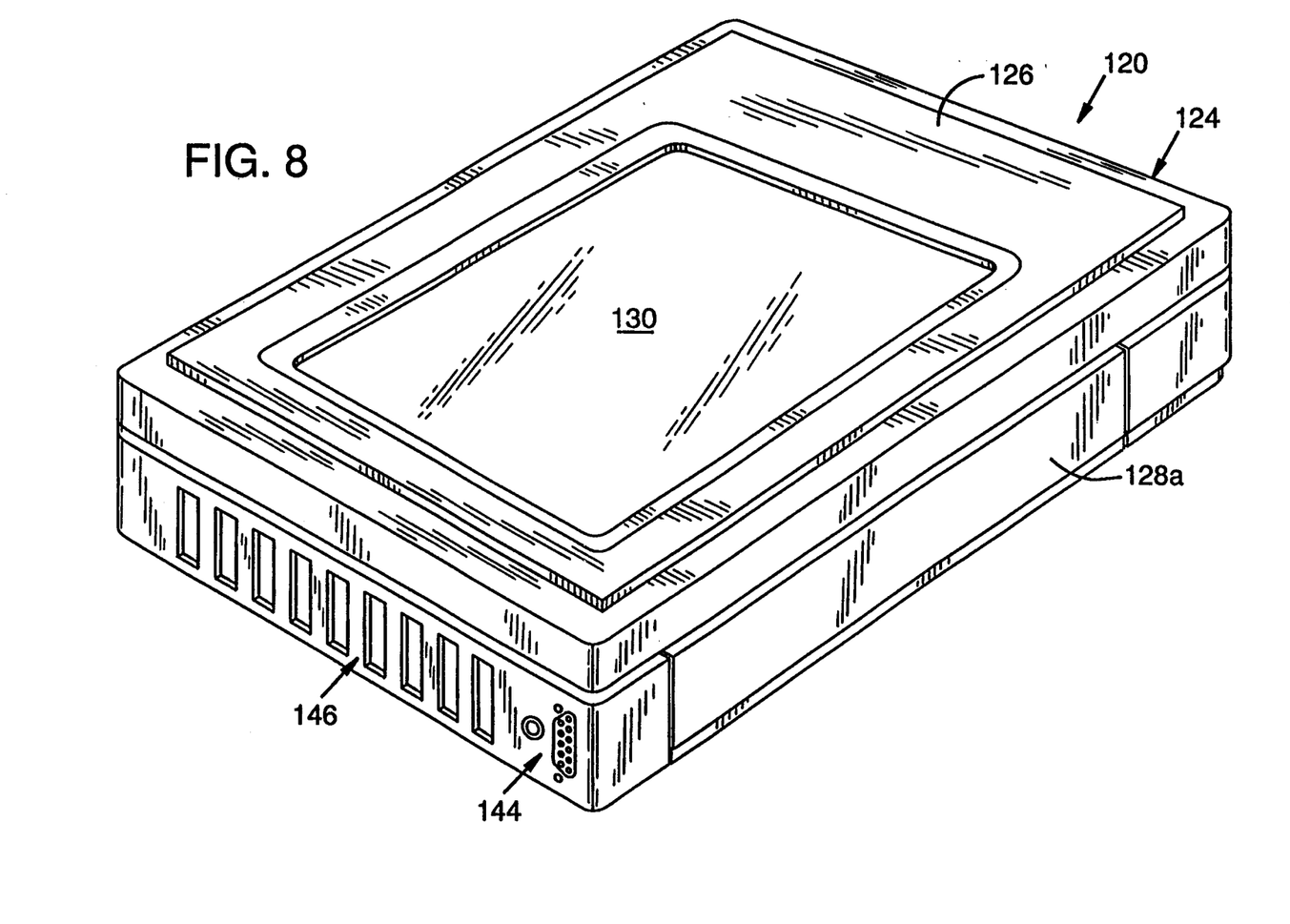
FIG. 8 is a perspective view of the display panel of FIG. 6 with the occluding panels retracted.

Annular case element 126 has a width 138a and a length 138b that are, respectively, greater and less than the corresponding width 140a and length 140b of light surface 132. When occluding panels 128a and 128b are in their retracted or storage position, case 124 is relatively small and convenient to handle and store (i.e., portable). Occluding panels 128a and 128b in their extended positions provide case 124 with a length 142 that is greater than length 140b of light surface 132, thereby blocking light that would otherwise propagate past annular case element 126 to the display screen similar to occluding panel 58 of case 54.

Case 124 includes sockets 144 for delivering power and display data to display panel 120, a pair of opposed air grills 146 (only one shown) through which ambient air passes to cool light modulating element 130, and a cradle 148 for supporting a remote control unit 150 similar to remote control unit 92 of display panel 50. Case 124 may be fabricated and encase modulation control circuitry in a manner similar to that of case 54.

It will be obvious to those having skill in the art that many changes may be made in the above-described details of the preferred embodiments of the present invention without departing from the underlying principles thereof. For example, an occluding panel could include a light source for illuminating the light modulating element when the occluding panel is in its retracted position, thereby allowing direct viewing of the display panel. The scope of the invention should, therefore, be determined only by the following claims.

I claim:

1. An overhead projection display panel case for supporting a light modulating element and encasing modulation control circuitry for controlling the light modulating element, the display panel modulating light transmitted from a light surface to display information on a projection screen, comprising:
   an annular case element for supporting the light modulating element to modulate light transmitted from the light surface; and
   a first occluding panel connected to and extendable from the annular case element for selectively occluding a portion of the light surface, the first occluding panel being pivotable relative to the annular case element and at least one of the annular case element and the first occluding panel encasing modulating control circuitry of the display panel.

2. The display panel case of claim 1 in which the annular case element includes a recess for receiving and storing the first occluding panel.

3. The display panel case of claim 1 in which the annular case element has a bottom surface for engaging the overhead projector light surface and a recess within the bottom surface for receiving and storing the first occluding panel.

4. The display panel case of claim 1 in which the first occluding panel encases modulation control circuitry of the display panel.

5. The display panel case of claim 1 further comprising a second occluding panel connected to and extendable from the annular case element for selectively occluding a portion of the overhead projector light surface.

6. The display panel case of claim 5 in which the first and second occluding panels are positioned along opposed side margins of the annular case element.

7. The display panel case of claim 5 in which the second occluding panel is pivotable relative to the annular case element.

8. The display panel case of claim 5 in which the annular case element includes first and second recesses for receiving and storing the respective first and second occluding panels.

9. The display panel case of claim 1 in which the modulation control circuitry is responsive to a remote control unit and the first occluding panel includes a recess for receiving and storing the remote control unit.

10. In an overhead projection display panel having a light modulating element supported by an annular case element for receiving and modulating light from an overhead projector light surface according to a modulation signal generated by modulation control circuitry so as to cooperate with the overhead projector to display information on a projection screen, the improvement comprising:
    a first occluding panel connected to and extendable from the annular case element for selectively occluding a portion of the overhead projector light surface, the first occluding panel being pivotable relative to the annular case element.

11. The display panel of claim 10 in which the annular case element includes a recess for receiving and storing the first occluding panel.

12. The display panel case of claim 10 in which the annular case element has a bottom surface for engaging the overhead projector light surface and a recess within the bottom surface for receiving and storing the first occluding panel.

13. The display panel case of claim 10 further comprising a second occluding panel connected to and extendable from the annular case element for selectively occluding a portion of the overhead projector light surface.

14. The display panel case of claim 13 in which the first and second occluding panels are positioned along opposed side margins of the annular case element.

15. The display panel of claim 13 in which the second occluding panel is pivotable relative to the annular case element.

16. The display panel of claim 13 in which the annular case element includes first and second recesses for receiving and storing the respective first and second occluding panels.

17. The display panel of claim 10 further comprising a remote control unit for controlling the display panel and the first occluding panel includes a recess for receiving and storing the remote control unit.

18. The display panel of claim 13 in which at least one of the first and second occluding panels encases modulation control circuitry of the display panel.

19. An overhead projection display panel case for supporting a light modulating element and encasing modulation control circuitry for controlling the light modulating element, the display panel modulating light transmitted from a light surface to display information on a projection screen, comprising:
    an annular case element for supporting the light modulating element to modulate light transmitted from the light surface; and
    a first occluding panel connected to and extendable from the annular case element for selectively occluding a portion of the light surface, the first occluding panel encasing modulation control circuitry of the display panel.

20. The display panel case of claim 19 in which the first occluding panel is extendable longitudinally relative to the annular case element.

21. The display panel case of claim 19 in which the first occluding panel is pivotable relative to the annular case element.

22. The display panel case of claim 19 in which the annular case element includes a recess for receiving and storing the first occluding panel.

23. The display panel case of claim 19 in which the annular case element has a bottom surface for engaging the overhead projector light surface and a recess within the bottom surface for receiving and storing the first occluding panel.

24. The display panel case of claim 19 further comprising a second occluding panel connected to and extendable from the annular case element for selectively occluding a portion of the overhead projector light surface.

25. The display panel case of claim 24 in which the first and second occluding panels are positioned along opposed side margins of the annular case element.

26. The display panel case of claim 24 in which the first and second occluding panels are pivotable relative to the annular case element.

27. The display panel case of claim 24 in which the annular case element includes first and second recesses for receiving and storing the respective first and second occluding panels.

28. The display panel case of claim 19 in which the modulation control circuitry is responsive to a remote control unit and the first occluding panel includes a recess for receiving and storing the remote control unit.

29. In an overhead projection display panel having a light modulating element supported by an annular case element for receiving and modulating light from an overhead projector light surface according to a modulation signal generated by modulation control circuitry so as to cooperate with the overhead projector to display information on a projection screen, the improvement comprising:

a first occluding panel encasing the modulation control circuitry and connected to and extendable from the annular case element for selectively occluding a portion of the overhead projector light surface.

30. The display panel case of claim 29 in which the first occluding panel is extendable longitudinally relative to the annular case element.

31. The display panel case of claim 29 in which the first occluding panel is pivotable relative to the annular case element.

32. The display panel case of claim 29 in which the annular case element includes a recess for receiving and storing the first occluding panel.

33. The display panel case of claim 29 in which the annular case element has a bottom surface for engaging the overhead projector light surface and a recess within the bottom surface for receiving and storing the first occluding panel.

34. The display panel case of claim 29 further comprising a second occluding panel connected to and extendable from the annular case element for selectively occluding a portion of the overhead projector light surface.

35. The display panel case of claim 34 in which the first and second occluding panels are positioned along opposed side margins of the annular case element.

36. The display panel case of claim 34 in which the first and second occluding panels are pivotable relative to the annular case element.

37. The display panel case of claim 34 in which at least one of the first and second occluding panels encases modulation control circuitry of the display panel.

38. The display panel case of claim 29 further comprising a remote control unit for controlling the display panel and the first occluding panel includes a recess for receiving and storing the remote control unit.

* * * * *